United States Patent [19]

Tsumura

[11] Patent Number: 5,547,202
[45] Date of Patent: Aug. 20, 1996

[54] COMPUTER GAME DEVICE

[75] Inventor: Mihoji Tsumura, Osaka, Japan

[73] Assignee: Ricos Co., Ltd., Japan

[21] Appl. No.: 367,686

[22] Filed: Dec. 30, 1994

Related U.S. Application Data

[63] Continuation of Ser. No. 19,052, Feb. 18, 1993, abandoned.

[30] Foreign Application Priority Data

| Feb. 18, 1992 | [JP] | Japan | 4-069560 |
| Feb. 28, 1992 | [JP] | Japan | 4-079182 |
| May 21, 1992 | [JP] | Japan | 4-156008 |
| Jul. 22, 1992 | [JP] | Japan | 4-217130 |
| Jul. 22, 1992 | [JP] | Japan | 4-217131 |
| Jul. 22, 1992 | [JP] | Japan | 4-217132 |

[51] Int. Cl.$^6$ ................................... A63F 9/22
[52] U.S. Cl. .................. 463/29; 463/40; 463/41
[58] Field of Search .................. 273/439, 85 G

[56] References Cited

U.S. PATENT DOCUMENTS

| 4,247,106 | 1/1981 | Jeffers et al. | 273/85 C |
| 4,752,068 | 6/1988 | Endo | 273/434 |
| 4,792,849 | 12/1988 | McCalley et al. | 358/86 |
| 4,829,558 | 5/1989 | Welsh | 372/92 |
| 4,920,432 | 4/1990 | Eggers et al. | 360/33.1 |
| 4,972,503 | 11/1990 | Zurlinden | 455/2 |
| 5,036,389 | 7/1991 | Morales | 358/84 |
| 5,051,822 | 9/1991 | Rhoades | 358/86 |
| 5,223,923 | 6/1993 | Morales-Garza | 358/84 |
| 5,226,177 | 7/1993 | Nickerson | 455/2 |
| 5,251,909 | 10/1993 | Reed et al. | 273/439 |

*Primary Examiner*—William H. Grieb
*Attorney, Agent, or Firm*—Thompson Hine & Flory P.L.L.

[57] ABSTRACT

The invention comprises a transmission device incorporating a database holding numerous game data and a receiving device on which computer games can be played. The receiving device accepts numerous game data transmitted cyclically by the transmission device, selects and stores specified game data and is used to play the game. When the receiving device is used as a commercial game machine, it is fitted with a coin input unit. When a coin is input into the unit, key input is enabled and the game can then be played. If a game calls for more than one player, the host computer at the transmission device end controls the order of input of the terminal devices.

4 Claims, 11 Drawing Sheets

| A | B | I | C | D | E |
|---|---|---|---|---|---|
| SYNCHRO CODE | FILE TYPE CODE | STORAGE ENABLE ID | DATA | ERROR CONTROL | SYNCHRO CODE |

COMPUTER GAME DEVICE

This is a Continuation of application Ser. No. 08/019,052, filed Feb. 18, 1993, now abandoned.

BACKGROUND OF THE INVENTION

1. Field of the Invention

The invention relates to the communication of large volumes of data of the type used in computer games. The invention is characterized by the efficient storage of said data on receipt. The invention also makes use of identification codes to enable the distributor of the data to charge the user of the receiving device in accordance with the number of times the user makes use of said data.

The invention is also designed in such a way as to enable a computer game program to be downloaded from a host computer to a game terminal or else to enable data relating to an unfinished game to be uploaded and stored temporarily in the host computer in such a way that, in cases in which an unfinished game has had to be suspended at the user terminal end, the same game can be resumed at a later time from the point at which it was suspended.

2. Description of the Prior Art

Computer communications technology that enables the use of a telephone line to connect individual computers for the exchange of binary data has long been known. Since computer game programs and game data are similarly expressed in a binary coded form, they can also be transferred between computers using this type of communications technique.

If the data to be transferred is limited in size, inter-computer transmission using an analog telephone line does not take long and poses few problems. Large volumes of data, on the other hand, take a long time to transmit, even along digital lines (ISDN) that enable transmission speeds of up to 64 Kbps. The configuration of a network whereby a plurality of local terminals are connected by telephone lines to a central host computer such that each local terminal is able to access and download data from said host is also well known. However, in this type of configuration, a temporary concentration of access calls from local terminals can easily lead to an overload of the host computer's processing capacity and this will in turn lead to processing delays. Moreover, the longer transmissions take, the more congested the traffic becomes, and more lines have to be added to overcome the problem. This, however, creates a vicious circle by compounding the original problem. On the other hand, if the telephone network is to consist entirely of high-speed digital lines, this means the laying of new optical fiber cables, a task which may well be easier said than done.

There is a wide variety of means available for the retrieval of data from a database held in a host computer. A local terminal could be used, for example, to access the host computer and, on entering a predetermined key word or conditional expression, to extract and retrieve the required data from the massive body of data in store. In this sort of case, two-way communication must be possible between the host computer and the local terminal device. On the other hand, there are means whereby the user can simply select the data he or she requires from an incoming stream of serially transmitted data. In this case, however, there is no necessity for both sides to conduct two-way communication with each other. It is much more important in this second case to determine how and in what sort of order the high-speed data transmission is to be carried out. For this reason, the second type of transmission is probably best made via satellite as a means of preventing any unnecessary traffic build up.

The transmission of data via satellite is not always appropriate, however, in that it is very much a one-way activity with potential users needing only to supply themselves with the appropriate receiver in order to obtain virtually unlimited volumes of high value added data free of charge. An encoder could, of course, be used prior to transmission to scramble the data such that only users with suitable decoders would be able to unscramble the data at the other end. Again, however, a potential user would only need to supply himself with a decoder to enable him to decode all the data received. While it would be possible to impose a uniform charge for use of the decoder, it would still not be possible to charge users in proportion to their actual use of the data received. The broadcasting of game programs by satellite would obviously create problems and the loss of potential revenues to suppliers would be almost incalculable. There is clearly therefore a pressing need for the development of an appropriate charging mechanism for use in this type of situation.

There are two main applications for computer games, namely home use and commercial use. Games for home use are normally played on TV game machines into which different ROM cassettes containing game programs and data can be inserted and removed at will. Personal computers can be used in place of dedicated TV game machines with the relevant game programs being held on floppy disks. A single machine can thus be used to play a variety of different games simply by changing the ROM cassette or floppy disk containing the game program. By contrast, commercial game machines come in many different shapes and sizes, typically either inset into the horizontal surface of a small table or else with an upright visual display arrangement. Such machines are limited, however, in that each one can generally be used to play only one type of game. The owner of this type of machine must change the ROM board if he wants to change the game. A player using this type of machine cannot therefore freely select the game of his choice and can play only the game for which the machine has been programmed.

Games can be broadly divided into three main types, namely shooting games, road race games and role playing games (hereafter referred to as "RPG"). Shooting and road race games normally involve scoring points under certain fixed conditions and, for this reason, the length of a game is to some extent limited. This type of game is thus ideally suited for playing on commercial machines. RPG, on the other hand, require the player to assume a particular role and then to spend such time as may be needed in order to fulfill the tasks required by that role. This leads to problems in that, if the operating rate of this type of machine over time cannot be clearly defined, then it will simply not be appropriate for use in this type of commercial context. Recently, however, RPG are becoming increasingly popular with the result that, if a way can be found of drawing effectively on this library of games for use in commercial game machines, this will boost the operating rate of each machine at a stroke.

In the case of shooting games, the ROM data is processed sequentially and always in the same way, no matter how many times the game is played. As a result and since this type of game cannot be started at a mid-point, the player soon gets bored. With the passage of time, the profitability of this type of game thus tends to decline quite sharply. Thus, while computer games such as shooting games tend to have a natural time limit and to be generally well suited for commercial use, their popularity is also crucially dependent on the skill and originality of the game scenario and this means that great care needs to be taken by owners when selecting games for use in commercial game machines.

Even if computer games were to be downloaded from a host computer to a local game terminal using one or other of the techniques referred to above, the games themselves are presently designed for use only by the player or players using that specific game terminal. Up to now, little thought has been given to the possibility of more than one player, each in a different location, participating in the same game. Even RPG tend to be designed not for groups of players but rather for individuals to pit their wits against the machine in a one-to-one situation. If more than one player, each using a separate machine, were able to participate in the same game, however, the games themselves would inevitably become more complex in nature and a variety of extremely interesting simulations could easily be developed.

SUMMARY OF THE INVENTION

It is a general object of the invention to provide a device for the efficient processing of game data transmitted in one direction only in the form of radio signals.

It is another object of the invention to provide for the scrambling of all data prior to transmission and, at the same time, to provide a device that will enable users to be charged precisely in accordance with the number of individual data units they use.

It is still another object of the invention to provide a technique whereby even games that take a long time to complete will be commercially viable when played on commercial game terminals. It is a further object of the invention to provide a technique whereby games that have been suspended prior to completion can be played again from the point of suspension on the next available occasion.

It is a still further object of the invention to provide a system whereby a plurality of players using mutually remote machines are each able to participate in the same game, thereby enabling the commercial use of RPG while at the same time extending the overall scope of computer games in general. It is another object of the invention to disclose a concrete system configuration specifically designed to overcome these types of problems.

DESCRIPTION OF THE PREFERRED EMBODIMENTS

There follows a description of the preferred embodiments of the invention by reference to the accompanying drawings.

Figure 1:
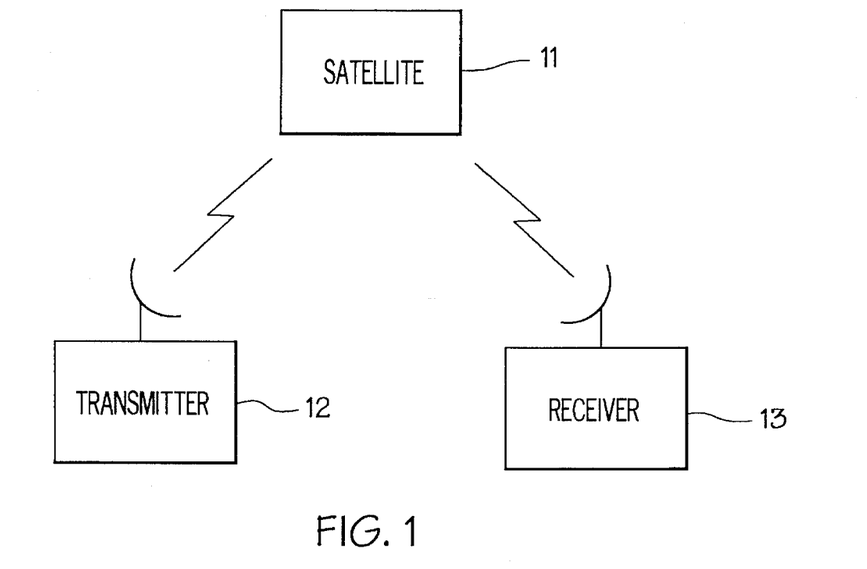
FIG. 1 is a block diagram illustrating a form of communication using a communications satellite.
Figure 2:
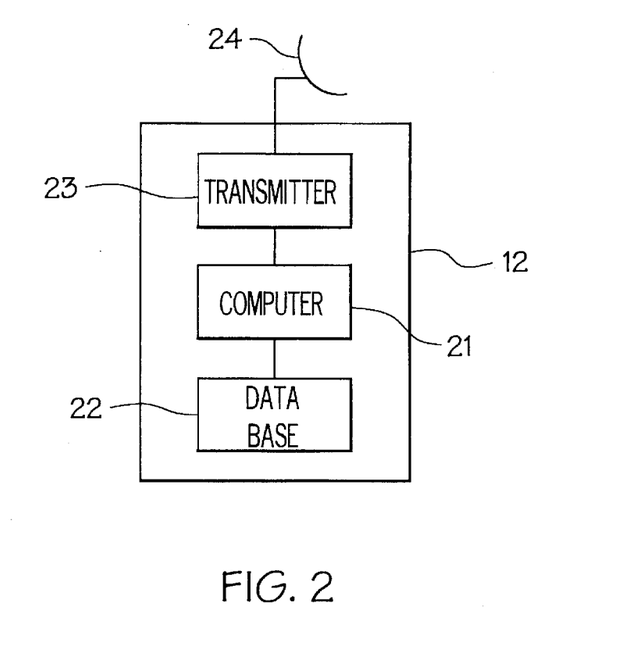
FIG. 2 is a block diagram of a transmission device in which a database is stored.

FIG. 1 is a block diagram illustrating the nature of radio transmission via a communications satellite from a transmission device to a receiving device, in which 11 is a communications satellite, 12 a transmission device and 13 a receiving device. As shown in FIG. 2, the main components of the transmission device 12 are a computer 21, which is used to control transmission, a database 22, which contains the data for transmission, and a transmitter 23, the radio waves emitted by said transmitter 23 being beamed at said communications satellite 11 by way of an antenna 24. The transmission database 22 contains the data for a plurality of computer games, said data being arranged in the form of files and transmitted cyclically in a prescribed order. For example, if the game data stored in said transmission database 22 consisted of 100 files of an average size of 500 kB, all the files could be transmitted over a period of approximately five minutes at a transmission speed of 1.5 Mbps. In other words, even with the inclusion of all the ancillary data, such as headers, footers and error correcting bits, one complete file can still be transmitted in approximately three seconds. Moreover, since a single transponder can transmit data on 10 different channels simply by changing the frequency/wave band, one transponder can be used to carry out the operation outlined above on 10 different channels at the same time, providing only that it is used exclusively for that purpose.

Figure 3:
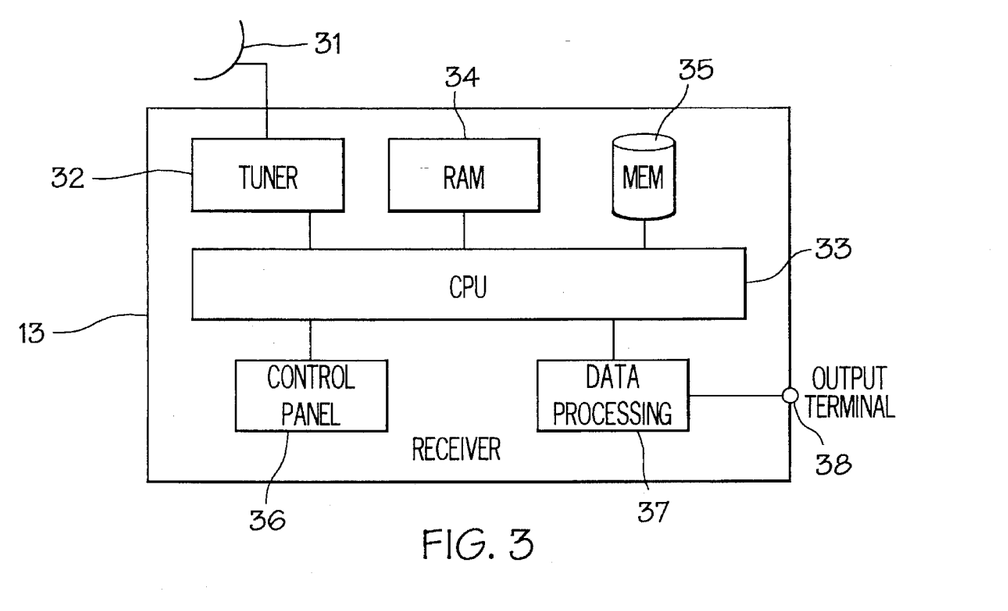
FIG. 3 is a block diagram of a receiving device.

The configuration of the receiving device 13 is shown in FIG. 3. In the figure, 31 is an antenna for the receipt of signals from the satellite, 32 is a tuner, 33 is a CPU that analyzes the digital data received and controls the terminal device as appropriate, and 34 is a RAM, which used by the CPU 33 both as a buffer and as memory space for data processing. 35 is a large-scale memory device that is used to store the digital data received, 36 is a control panel that is used to specify and save the required game data and 37 is a data processing device that is used to process the selected data as appropriate. 38 is an output terminal which outputs both display and audio signals to externally connected visual display and audio units to enable the game to proceed. There are also, of course, interface connections between the CPU 33 and each of the external units such as the tuner 32 and the memory device 34, plus a data bus to facilitate the internal transfer of data, although these have been omitted from the drawing. The tuner 32 comprises not only the usual selection of circuits that are used for the receipt of satellite signals, such as a tuning circuit, a detection circuit and an amplification circuit, but also a decoder to decode signals that have been encoded for the purpose of scrambling the original transmission and a packet disassembler for use when packet transmission mode is employed.

Figure 4:
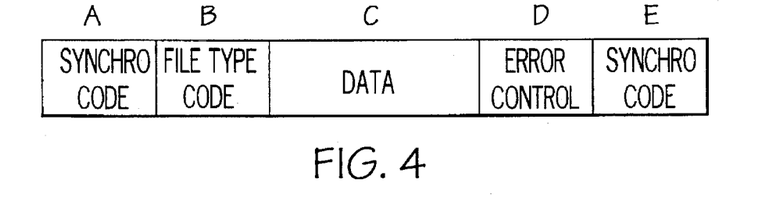
FIG. 4 is a stylized representation of the structure of the data transmitted and received within the terms of the invention.

FIG. 4 illustrates the structure of the data to be used. Starting from the head. A is a synchronization code, B a file type code, C the data itself, D an error control code and E a synchronization code. The file type code B indicates the kind of data the file holds and contains items such as the name of the game and the relevant game number.

We will now briefly summarize the way in which the invention functions as a whole. The transmission device 12 and the receiving device 13 are used to carry out data transfer by way of a communications satellite 11. Communication takes place in one direction only, from the transmission device 12 to the receiving device 13. The transmission computer 21 reads game data in a prescribed order from the database 22 in which it is stored and, after adding various control and other necessary signals, outputs it in the form of a data string to the transmitter 23. Next, the tuner 32 in the receiving device 13 selects an appropriate channel and, with the help of the RAM 34, transfers game data with a number corresponding to the number input from the control panel 36 into the large scale memory 35. The game is then played with the help of the data processing device 37.

The following is a more detailed explanation of the way in which game data is transmitted within the scope of the system outlined above. First, The transmission database 22, which is held in the transmission device 12, contains a plurality of game data (game data and the data maps required to play the game, for example). This is assembled in file form with the main body of the data C having several other items added to it to complete the file. First, a type code B is added to the main body of the data C in the form of a header. Next, an error control code D is added and finally synchronization codes A and E are added at each end of the data string to complete the assembly of the transmission file. If an item of game data is particularly big, the error control code D will also be big and this will seriously reduce the efficiency of the transmission in terms of time taken. In this sort of case, therefore, it is preferable if the game data can be broken down into packets for transmission purposes. In this case, the packet related data would be included in the file type code B and transmission carried out in accordance with known packet communication protocols. If there were, for example, 100 items of game data stored in the transmission database 22, each item would be subjected to the same file processing operation and then beamed in the prescribed order in the form of radio waves from the transmitter's 23 antenna 24 to the communications satellite 11. The order of transmission is determined quite simply by assigning an order to the game data in advance and then transmitting the data in accordance with the predetermined order. Once the 100 items of game data have been transmitted, the whole transmission process is repeated, starting again with the first item of data, thereby establishing a cyclical pattern of transmission. For game data with an average size of 500 kB as outlined above, the time taken for each cycle would be about five minutes. The figures and times referred to above will obviously vary depending on the size of the data being handled and on the total number of games involved.

We will now explain the operation of the receiving side. The radio waves received by way of the antenna 31 are all input to the tuner 32. However, this does not mean that all the game data received needs to be stored and there are times when it will be enough simply to select those items of data that are required. The control panel 36 can be used for this purpose. In other words, if the order (numbers) that has already been assigned to the game data is input from the control panel 36, this will be processed by the CPU 33, the data strings input serially from the tuner 32 will be checked and game data with numbers with which the file type code B matches stored in the large scale memory device 35. The large-scale memory device 35 normally consists of a hard disk or optical disk. The RAM 34 acts as a buffer memory which copes with the extremely high speed of the data transmission by temporarily storing each item of data as it is received and then matching it with a number input from the control panel 36 and transferring only game data with a matching number to the large-scale memory device 35. When the required data has been transferred into the large-scale memory 35, the tuner 32 will discard any remaining data unless it receives fresh instructions from the control panel 36. The game data held in the large-scale memory device 35 is then processed in accordance with procedures determined by the data processing device 37. In this embodiment, the data processing device 37 is located inside the computer game machine and its output is connected to the display and sound production device (not shown in the drawing) by way of an output terminal 38. In the drawing, the data processing device 37 is shown under the direct control of the CPU 33. This need not be the case, however, and a different configuration might be used whereby an interface would be introduced between the two or else the two could be linked by means of a disconnectable socket, thereby physically separating the data processing device from the CPU.

If the transmission frequency or phase are offset in order to make a plurality of channels available for use in the game data transmission mode, it will be necessary to use the control panel 36 to check which channel the required game data is on and then to select the appropriate channel in advance.

For the purposes of the present embodiment, we have chosen to use a large-scale memory device to store the game data. The capacity of this sort of device is sufficient, however, to enable it to hold more than one game at a time. It is, in fact, more normal to use a large-scale memory device 35 to store a plurality of game data or, in other words, files. It is obviously possible, in this sort of case, simply to read the required game data out of the large-scale memory device 35 and into the data processing device 37 in order to play the game. However, this would also create the need to access the large-scale memory 35 by way of the CPU 33 fairly frequently during the course of a game. If a need also arose, while the game was in progress, for new input data to be transferred from the tuner 32 into the large-scale memory 35, this would call for more complex processing in the form of, for example, an interrupt write operation or dummy parallel processing and this would in turn call for the use of a more powerful CPU 33. We have dealt with this problem with the help of the dedicated read memory device 51 shown in FIG. 5. This device enables the required type of game data to be read out of the mass of game data held in the large-scale memory device 35 and transferred to the dedicated read memory device 51 which is then accessed by the data processing device 37 in order to play the game. If, while a game is being played using the data processing device 37, a need also arises to store game data, received by the tuner 32, in the large-scale memory device 35, interrupt processing will, of course, still be necessary but the use of two memory devices 36,51 will enable separate processing and this significantly simplifies the operation. The transfer of a file from the large-scale memory device 35 to the dedicated read memory device 51 can be carried out either by copying the source file and transferring the copy, thereby leaving the source file in place, or else by transferring the source file itself, thereby effectively erasing it from the large-scale memory device 35. The dedicated read memory device 51 envisaged for the present embodiment of the invention would not be what is normally known as a read only memory (ROM) but would be a combined read and write memory (RAM).

Figure 5:
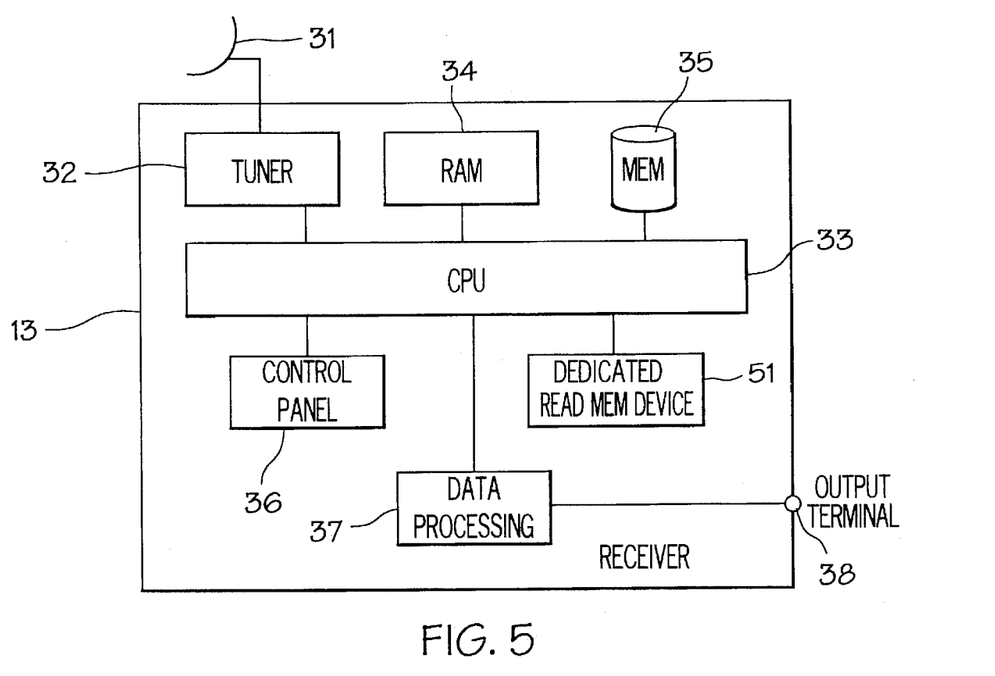
FIG. 5 is a block diagram of an alternative embodiment of the receiving device.

For the purposes of the explanation given so far, the data processing device 37 has been assumed to be contained inside the receiving device 13, as shown in FIGS. 3 and 5, but it could be just as easily configured entirely independently of said receiving device 13. In this sort of case, an independently portable memory device, such as a floppy disk unit, could be used as the dedicated read memory device 51 shown in FIG. 5 and the game data read onto a floppy disk in order to play the game. It would thus also be possible to copy the data relating to the game to be played onto a floppy disk inserted into the dedicated read memory device 51 and then to remove the floppy disk and transfer it to a separate personal computer that could then be used in place of the data processing unit 37 to play the game.

Figure 6:
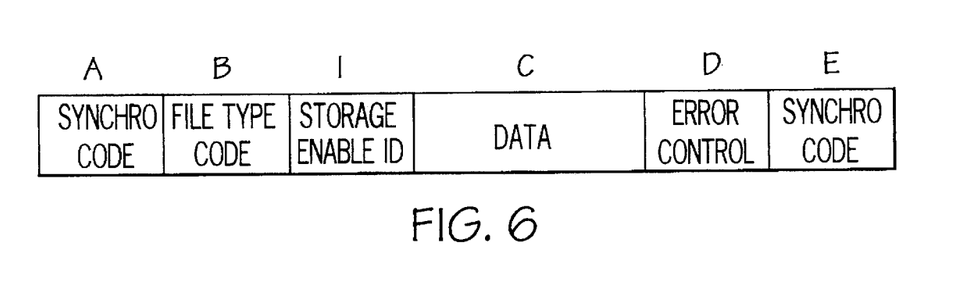
FIG. 6 is a stylized representation of an alternative data structure to the one shown in FIG. 4.

FIG. 6 illustrates a different data structure from that shown in FIG. 4. The purpose of the alternative structure is to allow the supplier of the game data the additional facility of charging the user in accordance with the amount of data used. Starting from the head, the alternative data structure comprises a synchronization code A, a file type code B, a storage enable ID code I, the data itself C, an error control code D and another synchronization code E. In other words, an additional storage enable ID code I has been inserted in between the file identification code B and the main body of the data C shown in FIG. 4. The storage enable ID code I is an essential feature of the structure of data transmitted and received within the terms of this invention because it is by means of this code I that it is possible to record an additional charge for each additional item of game data stored. In other words, if the control panel 26 on the receiving device 13 is used first to input a file type code B and then to input a storage enable ID code I, only game data with a matching ID can be read in. One way in which the user of the receiving device 13 could obtain the requisite storage enable ID code I would be by accessing the transmission computer 21 in the transmission device 12 by way of a telephone line, specifying the target game data and then receiving the appropriate ID code answer-back/in the form of an answer-back. In this case, the transmission computer 21 could count the number of times it was accessed and charge the user accordingly. Whichever method is used, in cases in which the receiver is required to obtain an ID code, either the transmission device 12 or else the data supplier must have some way of knowing how often disclosure of the ID code is requested. Moreover, since there is a danger that if the same ID code is used for too long, it will be open to unauthorized use, it would probably be a good idea to change all the ID codes, say, once a week.

We will now explain the operation of the whole invention, assuming a data structure of the type illustrated in FIG. 6. The transmission device 12 contains a transmission database 22 in which a plurality of game data (computer game programs and file data needed to play said games) are stored, each item of game data being assembled in the form of a body of data C to which is then added a file type code B in the form of a header and a predetermined storage enable ID code I. Next, an error control code D is added and finally synchronization codes A and F are placed one at each end of the data string to complete the assembly of the file. It is preferable, as explained above, if the data can be broken up as and when necessary into a plurality of packets for transmission purposes. Next, at the receiving end, an antenna 31 is used to pick up the incoming radio signals which are input to a tuner 32 and handled in accordance with one or other of the procedures outlined by reference to FIGS. 3 and 5 above. The technological feature that distinguishes this embodiment from any other is the fact that only when a code has been input from the control panel 36 that matches one of the storage enable ID codes incorporated into the incoming stream of game data will the data containing the matching ID code be stored by the game machine. The game data received by the tuner 32 is not therefore automatically stored in its totality. If a plurality of ID codes obtained by the user are input one after the other at the receiving device end, the corresponding game data will be stored file by file in the large-scale memory device 35. Another item of data that can be input from the control panel 36 is the file type code B. In other words, if the sequence (numbers) assigned to the game data in advance is input from the control panel 36, this will be processed by the CPU 33 and matched with game data strings input from the tuner 32 that also incorporates the corresponding file type code B. If this data also contains the appropriate storage enable ID code I referred to above, then that data string will be saved to the large-scale memory device 35. If, after the required game data has been selected and stored in the large-scale memory device 35 in this way, no other instruction is input from the control panel 36, all further data input to the tuner 32 will be discarded.

Configured in the way described above, this invention enables the transmission of large volumes of data at extremely high speed and, since the bulk of the communication of the invention depends on broadcasting techniques, traffic congestion has no effect at all on the processing of the incoming data. Moreover, since the data is transmitted in cycles, each cycle being of only comparatively short duration, the system has the advantage of requiring the user to wait only a short time before being able to obtain the data he or she requires. The invention also makes use of ID codes such that game data can only be used by first inputting a previously obtained ID, thereby preventing the unauthorized use of high value added data and, at the same time, increasing the economic viability of the system. The invention also calls for the use of a dedicated read memory device, thereby enabling games to be played using this memory device and leaving the large-scale memory device free to receive such other inputs of game data as may be required.

Figure 7:
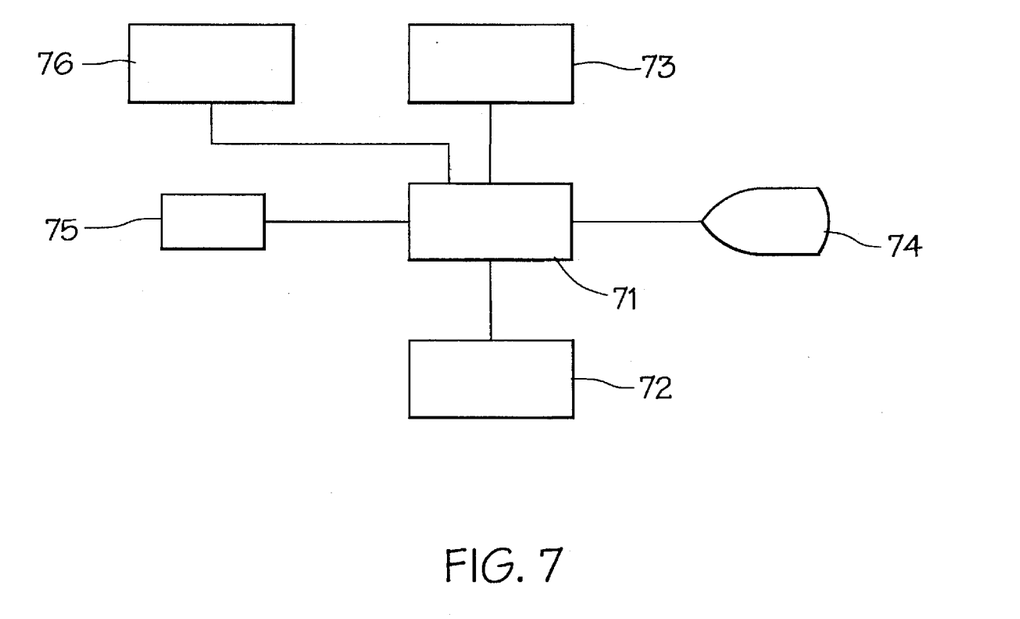
FIG. 7 is a schematic block diagram of the preferred embodiment of a device for the collection of charges for the use of a commercial terminal.

The technology discussed so far has been based on the assumption that game data is transmitted to the receiving device by way of a communications satellite. The technology to be described next is that appropriate for a commercial game machine for which, it is assumed, the user will pay a charge each time the machine is used. In other words, in the next embodiment of the invention, we will describe a system whereby a user will be able to stop playing a game for which he himself is paying before he has finished playing, but with the option of continuing to play the same game at a later date. FIG. 7 is a block diagram of an entire commercial game machine system. This machine comprises a CPU 71, a RAM 72 in which downloaded game programs are stored, input keys 73 consisting of number keys or such alphabetic keys as may be required, a visual display unit 74 on which the game can be played out, a receiving device 75 that selects the particular game data needed for the game being played from the incoming data stream being transmitted to the machine by way of a communications satellite, and a coin input unit 76 for the collection of such charges as may need to be made for use of the machine. There are also a number of hardware interfaces between the CPU 71 and the various peripheral devices but, for the sake of simplicity, we have omitted to describe these in detail. When the commercial game machine is switched on, a program already incorporated into the CPU 71 will cause the initial screen to be shown in the display and the machine will then stand by and wait for the first player. The visual display unit of a commercial game machine can be inset into the surface of a table, for example, or else set up in an upright position if so preferred. Although the present embodiment of the invention assumes the transmission of game data to the commercial game machine by way of a communications satellite, the game data could equally be transmitted to the game terminal by way of a wired digital public telephone line or else by way of optical fiber cables as used by CATV systems, for example, without requiring any fundamental change in the configuration of the system other than in the receiving device 75 itself.

We will now give a brief description, by way of example, of how a game would be played using this type of configuration. First, with the game machine showing the initial screen, the player puts a coin into the coin input unit 76 to pay for the use of the machine. Data is then transferred by way of a transmission path from the receiving device 75 and a game menu is downloaded and presented in the display 74 in the form of a list. If all the games cost the same to play, then it can be arranged so that the amount entered in the coin input unit 76 in the first place is enough to play one game. On the other hand, if the costs of the various games on the menu are different, the additional charge per game unit will also be shown. Since the insertion of a suitable coin or coins into the machine will enable key input, it will now be possible for, the player to use the input keys 73 to select the game he or she wishes to play and, in the event that an additional charge has to be paid, this information will also be presented in the display. If no extra charge needs to be paid, the game program requested will be received immediately and written into the RAM 72. Up to now, we have assumed that the game charge is paid by inserting a coin into a coin input unit 76 and by inserting additional coins if necessary. If the coin input unit 76 was replaced by a fee input unit that accepted paper money instead, for example, it would be possible for the player to be allocated an amount of playing time corresponding to the amount of money inserted and for the remaining value to be counted down as the player proceeded with the game. The adoption of this method would mean that, once the game data had been received, the player could play the game in accordance with the contents of the data held in the RAM 72. Moreover, whatever the case may be when game data is received via a communications satellite, if the system is configured such that the game data is downloaded by way of a wired line, the cost of the use of the line will inevitably increase the longer the connection is maintained. It would also, therefore, be possible to design the system such that, if the input keys 73 are not used within a specified length of time after the game menu has been displayed, the line will automatically be disconnected leaving only the menu in the display.

If the game selected using the means described above is one that does not take a long time to play, like a shooting game, for example, then it will be sufficient for the display simply to return to the initial screen when the game is finished. In the case of games like role playing games that can take a long time to play, on the other hand, it would be desirable to incorporate an additional charge facility that would function automatically at fixed intervals during the course of a game. The CPU's 71 internal clock, for example, could be used to calculate the unit time and to call for the insertion of an additional fee before a predetermined length of time has elapsed, and to cause the game to be discontinued as soon as that length of time has elapsed if the required additional fee has not been paid. An alternative arrangement would be to cause the game program to pause for a predetermined length of time after the game has been discontinued in order to allow time for the player to put more money in the machine. The pause could be released and the game continued if the requisite additional charge is paid within the time allowed.

In the case of games that take a long time to play, it is also quite common for the player himself to want to terminate the game before it has actually been completed. In the past, it has always been the case that if a player has terminated a game of his own accord, he has not been able to resume the game again at a later time from the point at which he originally left off. In the present embodiment of the invention, however, a suspension key has been added to the input keys 73 to enable a player to terminate a game before it is finished. When a game is terminated in this way by means of the suspension key, a password is shown in the display. There are two different ways in which this password concept could be put to use. The first one calls for the installation of a means of generating a password inside the game machine itself. In other words, if the suspension key was used during the course of a game, a password would be generated in accordance with the address of the game data in use at the time the game was suspended and that password shown in the display. In order to play the game again, the player would simply be required to memorize the given password and to enter it when he wished to play again. Since the password itself would be determined by reference to the particular address which the game had reached, the player would be free to input the password into a different game machine and still to start the game from precisely the point at which it was previously terminated. This mode of operation is particularly well suited to games that require only a comparatively small amount of data or for games for which the playing charge is fairly low. The second method, on the other hand, envisages the specification of a password selected by the player when suspending the game. The specified password can then be uploaded and stored in the game data supplier's host computer along with the address in the program at which the game has been suspended. Although the use of this second means requires the use of a higher performance host computer, it is also a more effective way of handling games which are particularly expensive to play. If passwords are stored in the host computer for a long time, this may eventually impair the host computer's processing capacity. For this reason, it would be useful if passwords were to be erased from the host computer's memory after the passage of a predetermined length of time. An alternative to this would be to issue each player with a personal identification code (ID) which the player would be required to input first before inputting his chosen password. It would be a simple matter then to restrict the registration of passwords to those accompanied by a preceding ID. In cases in which this second method is used and the host computer and the commercial game machine are linked by way of a communications satellite, it would of course be possible to carry out transmission in the opposite direction from game machine to host computer. The adoption of this sort of approach, however, would also place an inordinate cost burden on the game machine side. It would be possible, on the other hand, to reduce this burden by using telephone lines to upload from the game machine to the host computer.

Figure 8:
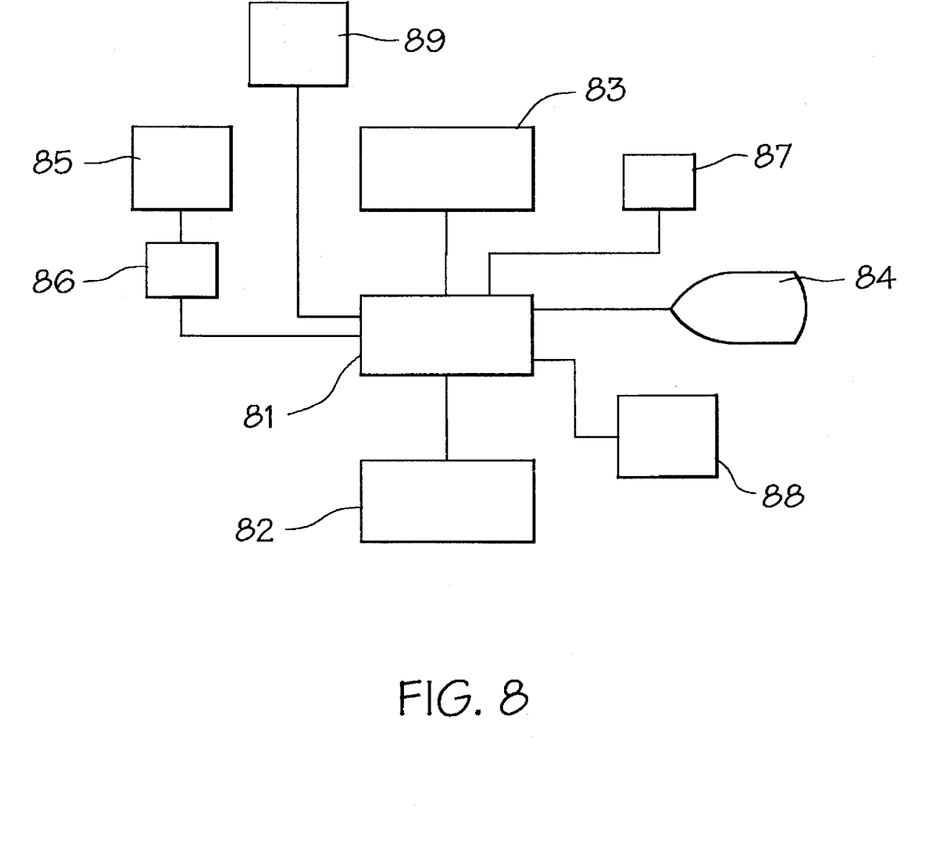
FIG. 8 is a schematic block diagram of an alternative embodiment of the device for the collection of charges for the use of a commercial terminal.

We will now outline by reference to FIG. 8 an alternative embodiment of the invention illustrating different approaches to the collection of charges and to the suspension of a game before it is finished. The drawing illustrates a known configuration in which 81 is a CPU which is used to run programs and control peripheral equipment, 82 is a memory device holding data relating to specified computer games, 83 is panel of input keys that are used to play the game, and 84 is a visual display unit which is used both to play the game and also to display information when necessary. 85 is a mechanical coin input unit into which players must insert an appropriate amount of money to play the game. The means by which coins are inserted into the machine to start the game does not differ materially from the comparable means outlined by reference to FIG. 7. More specifically, a signal generated by the insertion of a coin is relayed through an interface 86 to the CPU 81. The CPU 81 is, in fact, connected to the input keys 83 and the display 84 through interfaces but a detailed explanation of these features has been omitted for the purpose of simplicity. 87 is a suspension key that allows the player to terminate a game at a selected point. This key may, if necessary, be incorporated amongst the input keys 83. 88 is an information card output device, which outputs a card containing such information as might be required when a player initiates a forced termination of a game by means of suspension key 87. The information printed on the card includes the type of game being played, game data and addresses applicable at the time of the termination and machine related data, such as the game machine's identification number. This is all information of use when restarting a suspended computer game. The output of information from said information card output device 88 can take a variety of forms including that of a magnetic card or bar code that can be read by an optical card reader. Basically, the information card can take virtually any form providing only that it contains the necessary information. 89 is a card reading device that reads information from cards of the type described above to enable a player to resume a suspended game.

Figure 9:
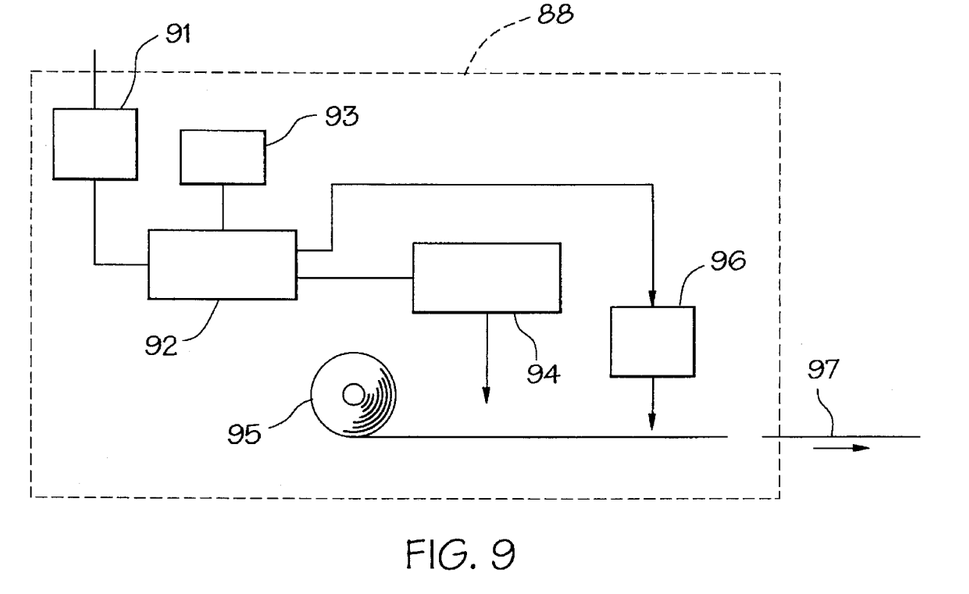
FIG. 9 is a block diagram of a typical data card output device.

We will now give an example of the operation of the information card output device 88 by reference to FIG. 9. Data sent from the CPU 81 via the interface 91 is processed by the MPU 92. 93 is a buffer memory used for the temporary storage of said data, 94 is a writing unit used to write information onto cards, 95 is a roll of material from which the cards are made, 96 is a cutter that cuts newly prepared cards with information written on them down to the specified shape and size after which the finished card 97 is discharged into the player's keeping. The writing unit 94 may be a magnetic head device in cases in which the card is to be loaded with magnetic data or else a bar code printer in cases in which the information printed on the card is to be in bar code form. Although the finished card 97 may well contain a wide range of information including the game program address at the time the game was suspended, the date and the identification number of the machine on which the game was being played, much of this is optional. If the game is to be resumed from the point at which the player originally terminated it, however, the information card must at least contain the address at which the game was suspended.

Figure 10:
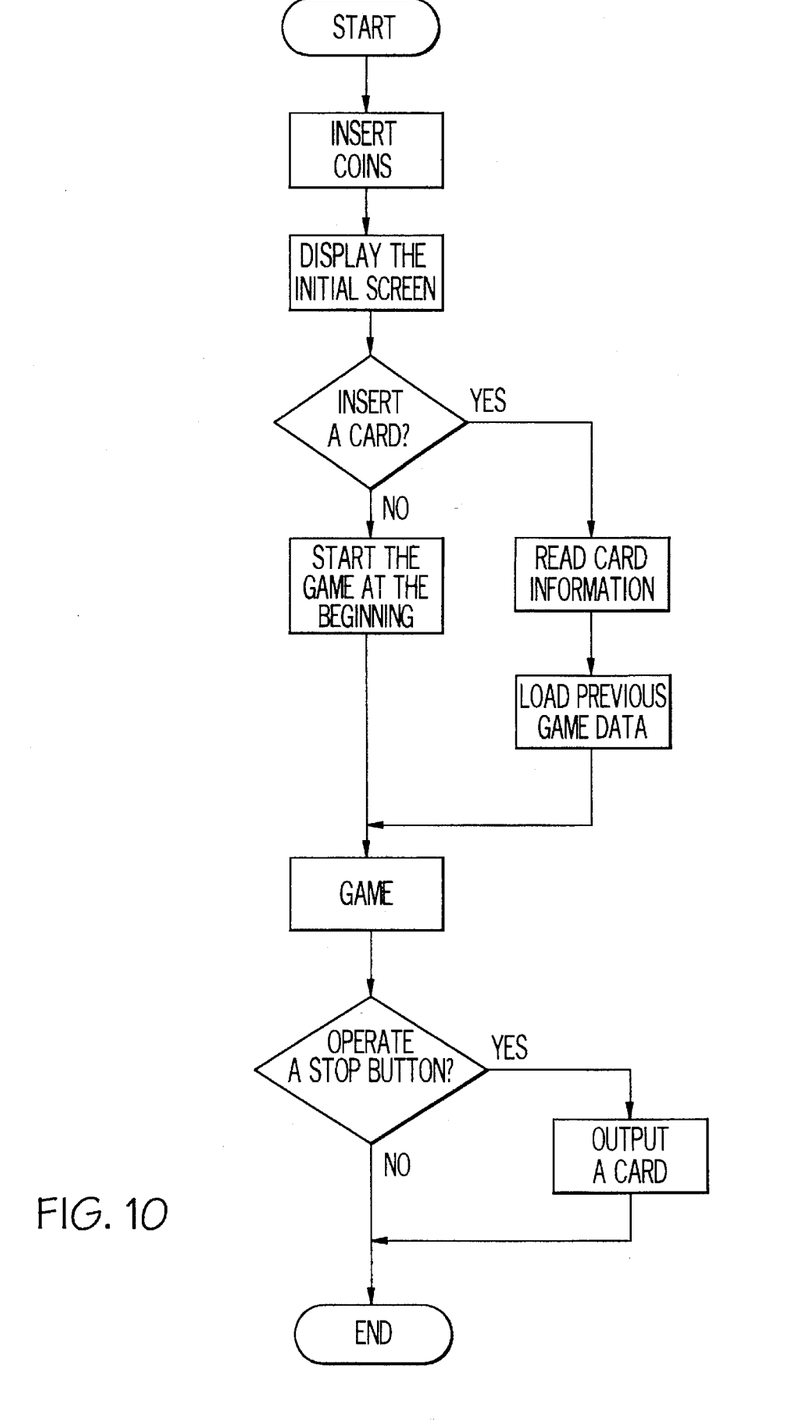
FIG. 10 is a flow chart illustrating the sequence of steps when using the device shown in FIG. 8.

FIG. 10 is a flow chart illustrating the sequence of steps involved in playing the game machine shown in FIG. 9. First, when a coin of the correct denomination is inserted into the coin input unit 85, the initial screen to start the game will be shown in the display. The player must then decide whether or not to insert an information card. If a card is not inserted, the player will have to use input keys, such as the start button, to instruct the machine to start the game. On the other hand, if an information card is inserted into the card reading device 89, game data will be loaded in accordance with the address and other information contained on the card to enable the game to be restarted from the precise point at which it was previously terminated. One way or another, resumption of a game by this means can be divided into two distinct types, the one being the case in which the game comes naturally to an end at that point and the other being the case in which the player actually initiates a forced termination of the game. The situation in which a game comes to a natural conclusion is a known end mode. However, if the player presses the suspend key 87 at this point, the current program address and other relevant information will be sent from the CPU 81 to the information card output device 88 where it will be printed onto an information card 97 and output into the player's keeping. This information could easily be used and re-used on any number of future occasions. The information card could equally be recovered after one use only or else after being re-used a specified number of times. Any one of these approaches may be selected as preferred. For the purposes of the above explanation, the device of this embodiment has been described as an independent unit operating in isolation from any particular system. However, it would be equally possible for said device to function as a terminal in a system rather than as an independent commercial game machine. In the latter case, communication with a host computer containing a plurality of game programs could be carried out either by way of a communications satellite or else by online connection. The sort of resumption method discussed here is most effective, in fact, when used in a system of this type. In other words, since there is ultimately no need for the game and the machine to stand in a one-to-one relationship with each other, there is equally no need for the machine owner to have to concern himself with the selection of suitable games. Similarly, once the player gets tired of repeatedly using the same scenario, he or she can simply press the suspension button in order to obtain a new card that will enable the game to be restarted from a more advanced point. This is an extremely attractive option in that it helps prevent the same game from becoming boring.

The sort of system outlined above enables the same machine to be used to play a variety of different games without any need for replacement of the ROM board or any other component. Moreover, since the necessary game data is supplied by a host computer, it is an extremely simple matter to change the game to a new one. Thus, providing a player is able to find a game machine, he will be able to play whatever game he chooses. This provides a solution to the old problem of one particular game machine becoming a focus of popularity to the exclusion of other machines in the vicinity. This in turn enables the load to be spread more evenly over several different machines and, in so doing, it also improves profitability, at least at the operating level. If the playing time for a particular game is long, the player has the option of pressing the suspension key to terminate the game at the point of his or her choice. Then the player needs only to input the password indicated by the terminated program or else one that he or she has specified in order to restart the game again from the point of termination. A card could alternatively be used to record the termination data. The invention thus enhances the attraction of role playing games of a type that has previously been felt to be somewhat inappropriate for use in game machines and, in so doing, it also makes possible a significant increase in the types of games that can be offered.

Figure 11:
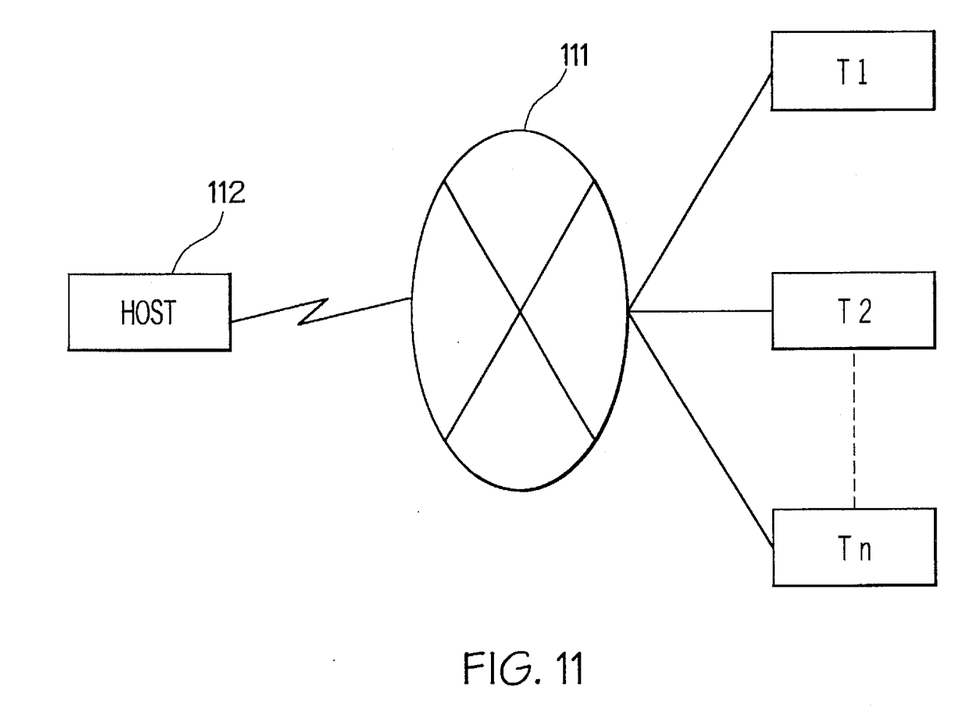
FIG. 11 is a block diagram of a network comprising a host computer and a plurality of terminal devices.

We will now describe a system whereby more than one player can take part in the same game. The explanation will be illustrated by reference to FIGS. 11, 12 and 13. FIG. 11 is a schematic representation of the sort of network appropriate to the application of the present invention. In the drawing. Ill is a communications network and 112 is a host computer holding a plurality of game programs. T1, T2 - - - Tn are each terminals with the ability to access the host computer 112 by way of said communications network 111. A communications system is formed when the host computer 112 and one or more of the terminals T are connected through the medium of the communications network 111. The network may be structured either to enable a two-way exchange of communications data along public telephone lines or else to enable one way transmission from the host computer 112 to the terminals T by way of a communications satellite and one way data upload from each terminal T1 - - - Tn to the host computer 112 by way of telephone lines. In other words, in the second case, upload and download communications would be carried out using different media. For the purposes of the following explanation, it will also be assumed that the game programs stored in the host computer 112 are role playing games (RPG) and that each program is designed to facilitate the participation of more than one player, each using his or her own game terminal. It goes without saying, of course, that the host computer 112 itself is capable of storing the programs of games other than RPG.

The present embodiment of the invention is configured in such a way as to make use of this type of network system. The conditions under which the game is to be played still remain to be determined, however. In other words, although the same game can be played by more than one player using a plurality of machines, the more complex the scenario of the RPG itself, the longer it will take to complete the game and thus the more remote the likelihood that all the players will either want or even be able to play the game at the same time. Similarly, the more players that take part in a game, the more sophisticated the game can be made but this will again raise the problems associated with simultaneous participation. For this reason, the present embodiment does not assume simultaneous participation in the game but rather that the individual players' input will first be uploaded and stored in the host computer. When a player wants to play the game, he will then access the host computer and download everything that has been input up to that point by the other players to his own terminal. The player will then be called upon to enter his next move.

Figure 12:
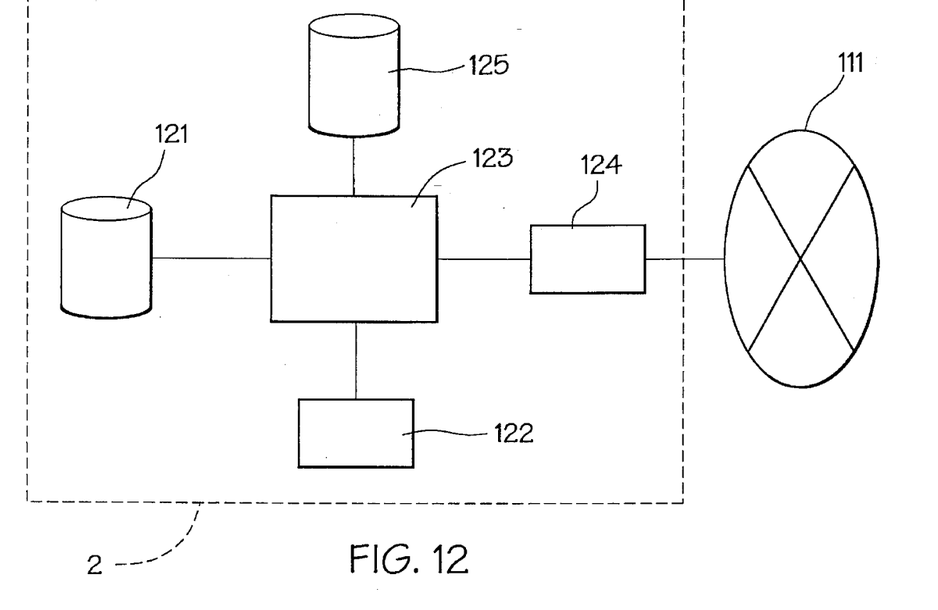
FIG. 12 is a block diagram of the internal configuration of said host computer.

Next we will explain, by reference to FIG. 12, how to start a game using a public line on which two-way communication is possible. The player first accesses the host computer 112 from his game terminal T1 and requests permission to participate in a particular game. The host computer 112 then reads the game data out of the database 121, creates the addresses required for said game in the register 122 and secures enough space to register the number of people needed to play the game. The first player's terminal T1 is then registered in the first registration space and an identification number is allocated and sent to the terminal T1, after which the line is temporarily disconnected. 123 in the figure is the CPU used by the host computer 112 to process the above operations and 124 is a modem. The identification number will from this point on be used to identify the player's role each time he plays the game. Each time the player accesses the host computer, he will input his identification number from the terminal T1 and receive in return the latest state of play of the game. In order to facilitate the entry of a new player using a different terminal Tx, the database 121 will hold only the game program and initial data. Play data accumulated during the course of the game will be stored in a separate memory means 125. If the RPG requested requires only two players to enable the game to be played, the host computer 112 will then await a second registration. If a second terminal T2 now accesses the host computer 112 and requests permission to participate in the game, the host computer 112 will register the new player in the space set aside for a second player in the register 122 and return the identification number it assigns to the second player back to the second terminal T2, after which it will temporarily disconnect the line. If the RPG has to be played by at least three players, the host computer 112 will go on standby until a third player accesses it and requests permission to take part in the game. When there are enough players registered to enable the game to be played, the host computer 112 will notify terminal T1 that the game is now ready for play, thereby completing the requisite conditions for the game to be started.

If the player using terminal T1 now accesses the host computer 112 again and inputs his identification number, the game will immediately start up on the visual display unit connected to his terminal and all the player will have to do is to use his keyboard to input the instructions appropriate to his particular role in the game. The player using terminal T1 can now carry on playing the game until he reaches the first point at which another player's contribution is required. Once it has been confirmed at terminal T1 that this point has definitely been reached, the appropriate program can then be executed to suspend the game and the participation of terminal T1 until further notice. Next, the host computer 112 will establish contact with the second terminal T2 and issue a message to notify the player at said second terminal T2 that the first player (terminal T1 in the present embodiment) has completed his part of the game for the time being. The player using the second terminal T2 will first confirm this by reference to the message on his visual display unit and then, as and when he is ready, he will access the host computer 112 and enter his identification number, after which the host computer 112 will download the necessary game program and data from its memory means 125 and the game will be reproduced on the basis of the instructions and other data input by the player using terminal T1. The player using terminal T2 can now continue to play the game, making selections in accordance with his role from lists of alternative options that can be called up onto the display as and when necessary. When the player using terminal T2 has gone as far as he can go without making reference to the other player, the game can be suspended by executing an appropriate termination command in the same way as described above, then withdrawing from the game until further notice. The participants in a game can in this way take part in line with the requirements of the program either alternately when there are just two players or one by one in order in cases in which there are more than two players. The procedures outlined above are sufficient to enable a game to be continued for as long as all the players are inclined to continue to play their roles. However, if one of them wants to drop out for any reason, the game has to be abandoned at that point. In order to prevent this type of problem from spoiling the game, the present embodiment of the invention calls for the host computer 112 to access the terminal from which input is no longer being received a predetermined number of times and then, after confirming that there has indeed been no further input, for the host computer 112 to take over the vacated role to enable the game to continue.

Figure 13:
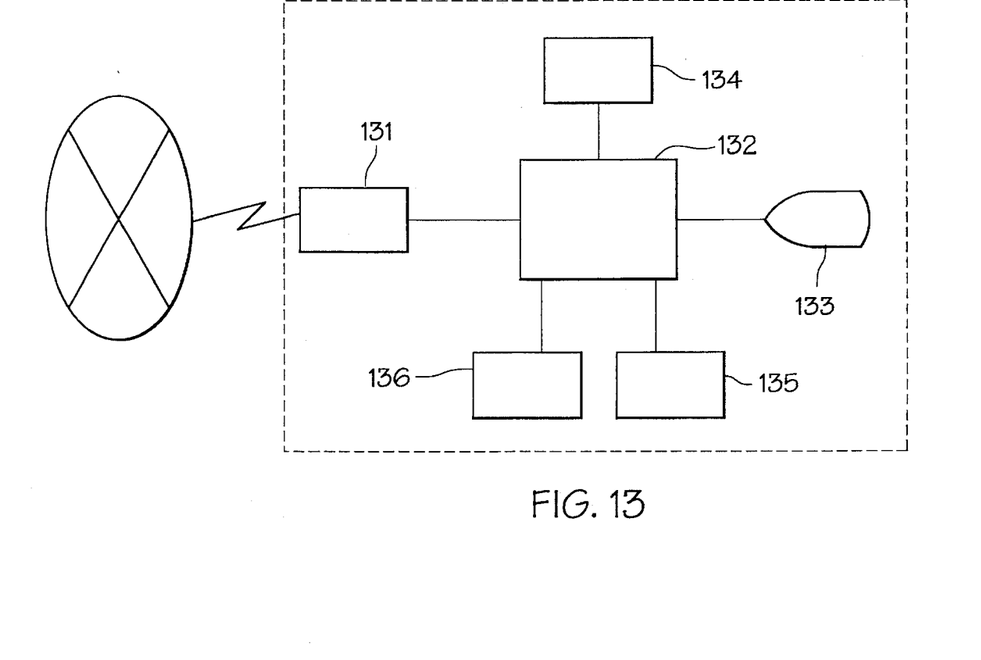
FIG. 13 is a block diagram of the internal configuration of each of said terminal devices.

FIG. 13 is a block diagram illustrating the basic configuration of each of the terminal devices T1 - - - Tn that constitute the counterparts of the host computer shown in FIG. 12. In the figure, 131 is a modem that connects the terminal with the network 111, 132 is the CPU that handles the control and processing requirements of all the terminals, 133 is a visual display unit on which the game is played, 134 is a keyboard which a player can use to input the instructions necessary to play the game, 135 is the main memory, which acts as a work area, and 136 is a memory means that is used to store the downloaded game program and all the latest play data. Basically, there is no particular limitation on the type of memory means 136 used and known memory devices such as a semiconductor memory or a hard disk device would be perfectly suitable. However, from the point of view of protecting the game program against unauthorized use or copying, the employment of a volatile semiconductor memory that cannot be backed up is to be preferred. There are also two different types of data to be exchanged with the host computer 112, namely game data, which is needed to start the game up and to enable it to be continued, and play data, which comprises all the data newly input up until the point at which the game was last suspended. Although it would save transmission time to store game program data in the terminals T and thereby dispense with the need for a player to download the program afresh each time he or she wishes to resume the game, this approach would be accompanied by a risk of unauthorized copying of the program data and, for this reason, the present embodiment of the invention calls for the downloading of program data afresh each time the game is played.

In the present embodiment, a host computer and a plurality of terminal devices are combined in the form of a communications network. The host computer registers players for games that call for more than one player and then, when all the conditions are met for the game to commence, the host computer accesses each of the participating terminal devices in turn according to the order in which they have been registered to enable the game to proceed. This even enables games such as RPG to be played without the need to maintain a permanent line connection, while the automatic execution also makes possible the effective playing of the type of interactive games that were previously held to be impossible to play using remote terminals and a regular communications network. It is equally unnecessary for the players all to play at the same time. Provided only that the previous player has completed his or her part of the game, the next player can enter the game and play the part required by his role as and when he is ready to play. It is thus possible to create a system that imposes only minimal time restrictions on the user.

What is claimed is:

1. A computer game device comprising:

a host computer for storing game data, a plurality of terminal devices, and means for transmitting data between said host computer and said terminal devices, said host computer having means for registering said terminal devices as participants in a game, said terminal devices being registered in the order in which said terminal devices accessed said host computer, said terminal devices including means for accessing said host computer and means for registering as a participant in said host computer register, said host computer further including means for transmitting said game data to one of said registered terminal devices when a predetermined number of said terminal devices have been registered and, means for accepting uploaded play data from one of said registered terminal devices, and means for transmitting said play data along with said game data to a subsequent one of said registered terminal devices.

2. The computer game device of claim 1 wherein said means for transmitting data from said host computer to said terminal devices is a satellite, said means for transmitting data from said terminal devices to said host computer is telephone lines.

3. The computer game device of claim 1 wherein said transmitting means is telephone lines.

4. The computer game device of claim 1 wherein said host computer disconnects an incoming communication line from any terminal device which has accessed and registered in said host computer register, until a predetermined number of registrations have been made, when said predetermined number of registrations have been made, said host computer transmits a prescribed message to each of said registered terminal devices.

* * * * *